(12) United States Patent
Nakano et al.

(10) Patent No.: US 7,708,459 B2
(45) Date of Patent: May 4, 2010

(54) LOW-TEMPERATURE COMPARISON CALIBRATOR FOR THERMOMETERS

(75) Inventors: Tohru Nakano, Ibaraki (JP); Osamu Tamura, Ibaraki (JP); Hirohisa Sakurai, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 235 days.

(21) Appl. No.: 11/712,398

(22) Filed: Mar. 1, 2007

(65) Prior Publication Data
US 2007/0206653 A1    Sep. 6, 2007

(30) Foreign Application Priority Data
Mar. 2, 2006    (JP)    .............................. 2006-056860

(51) Int. Cl.
    G01K 15/00    (2006.01)
    G01N 25/00    (2006.01)
    G01K 17/00    (2006.01)
(52) U.S. Cl. .................................. 374/1; 374/10; 374/33
(58) Field of Classification Search .................... 374/1, 374/3
    See application file for complete search history.

(56) References Cited

U.S. PATENT DOCUMENTS

| | | | | |
|---|---|---|---|---|
| 2,299,867 A | * | 10/1942 | Wolfson | .......................... 374/3 |
| 3,350,915 A | * | 11/1967 | Staffin | ............................ 374/3 |
| 3,699,800 A | * | 10/1972 | Waldron | .......................... 374/1 |
| 4,523,859 A | * | 6/1985 | Bonnier et al. | .................. 374/1 |
| 6,398,405 B1 | * | 6/2002 | Yamada | ........................... 374/1 |

FOREIGN PATENT DOCUMENTS

| | | |
|---|---|---|
| JP | 2990276 B | 10/1999 |
| JP | 3465402 B2 | 8/2003 |
| JP | 2004-317193 A | 11/2004 |

OTHER PUBLICATIONS

P. Bloembergen et al.: "An International Intercomparison of Argon Triple Point Calibration Facilities, Accommodating Long-stem Thermometers", Metrologia 27 (1990); pp. 101-106.
G. Furukawa: "Argon triple point apparatus with multiple thermometer wells", in Temperature: Its Measurement and Control in Science and Industry, vol. 6, Part 1, American Institute of Physics (1992), pp. 265-269.
S. L. Pond: "Argon Triple-Point Apparatus for SPRT Calibration", in Temperature: Its Measurement and Control in Science and Industry, vol. 7, Part 1, American Institute of Physics (2002), pp. 203-208.

* cited by examiner

*Primary Examiner*—Gail Verbitsky
*Assistant Examiner*—Mirellys Jagan
(74) *Attorney, Agent, or Firm*—Sughrue Mion, PLLC

(57) ABSTRACT

A temperature varying low-temperature comparative calibration including a vacuum jacket, a comparative calibration block in the vacuum jacket which is formed of a material of a high heat conductivity and which is maintained at a fixed temperature by a refrigerator or a heater, a reference thermometer housing portion in the comparative calibration block in which a reference thermometer is mounted, and an insertion hole in the comparative calibration block through which a calibration target thermometer is inserted from outside the vacuum jacket via an introduction pipe. The introduction pipe is filled with heat exchange gas.

19 Claims, 3 Drawing Sheets

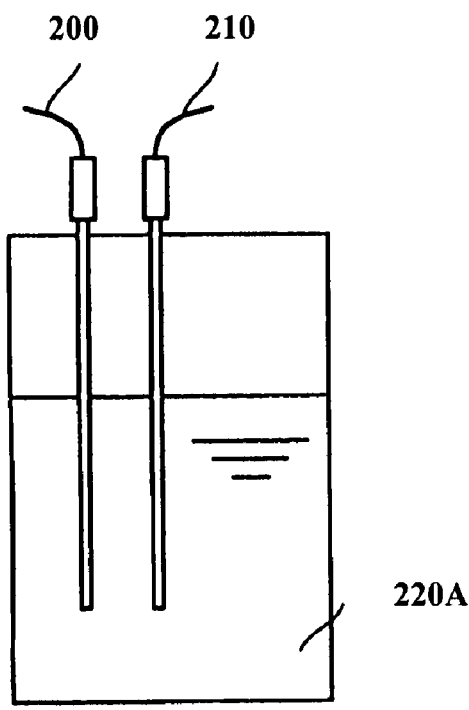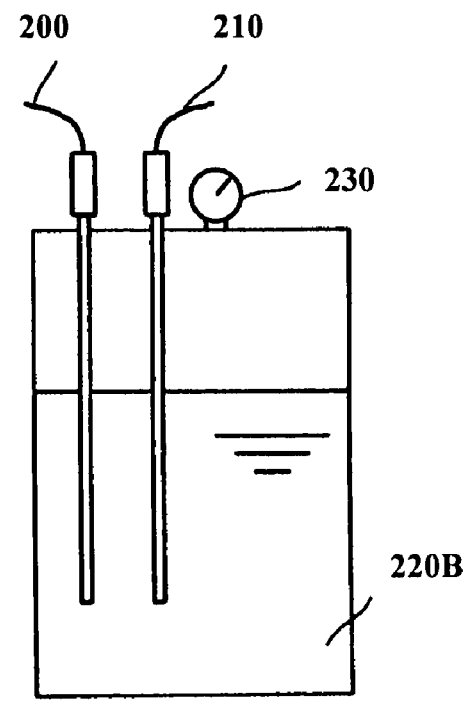
FIG. 3A RELATED ART
FIG. 3B RELATED ART

LOW-TEMPERATURE COMPARISON CALIBRATOR FOR THERMOMETERS

BACKGROUND OF THE INVENTION

1. Field of the Invention

The present invention generally relates to an apparatus that calibrates thermometers measuring low temperatures and, particularly, relates to a temperature variable low-temperature calibrating apparatus for thermometers capable of carrying out calibration within the temperature range of 90 K to 170 K, or as low as 77 K.

2. Description of the Related Art

Sheath-type thermometers have a temperature sensor at a tip thereof and are several tens of centimeters in length. Calibration of the sheath-like thermometer for low temperatures is performed as follows. Platinum resistance thermometers that meet conditions for the International Temperature Scale (the current temperature standard is the International Temperature Scale of 1990, documented in 1990) are calibrated on the basis of realized temperature fixed points for the International Temperature Scale, such as the water triple point of 273.16 K, the mercury triple point of 234.3156 K, and the argon triple point of 83.8058 K. For any temperature between these temperature fixed points, temperature scale of the platinum resistance thermometers is obtained by interpolation performed using calibrated values based on the temperature fixed points, in accordance with a method specified for the International Temperature Scale.

However, some thermometers, such as industrial sheath-like thermometers, cannot be calibrated using the temperature fixed points of the International Temperature Scale. Thus, for these thermometers, calibration is made by comparing a calibration target thermometer 210 with a thermometer 200 that meets the conditions for the International Temperature Scale and has been calibrated in accordance with the method specified for the International Temperature Scale hereinafter referred to as a "reference thermometer") by immersing the thermometers 200, 210 in a cold bath 220A maintained at a temperature (the calibration based on comparison is hereinafter referred to as "comparative calibration").

For example, in the related art comparative calibration shown in FIG. 3A, calibration for any temperature is performed in a cold bath 220A using a cooling liquid such as alcohol or silicone oil. However, the cooling liquid 220A has its viscosity increased or is solidified at low temperatures, which limits the lower limit on available temperatures. For currently commercially available comparative calibration apparatuses, this lower limit is about 170 K.

Accordingly, in order to perform calibration for temperatures lower than 170 K, a cold bath is employed which uses liquefied gas as a freezing medium 220B, as shown in FIG. 3B. However, for open air cold baths using, for example, liquefied oxygen or nitrogen, the calibration temperature is limited by the properties of the freezing medium, for example, the boiling point of oxygen (90.197 K) or nitrogen (77.352 K). Calibration apparatuses that vary temperature depending on the pressure of liquefied gas (for example, measured by a pressure gauge 230) have also been proposed. However, for these apparatuses, the range of temperature variations is limited by the physical properties of the freezing medium. Further, the pressure of the liquefied gas needs to be increased to raise the temperature, which is disadvantageous in terms of safety.

Consequently, would be desirable to provide an apparatus for calibration for the temperature range of 90 K to 170 K, or even as low as 77 K, that does not use any cooling liquid or liquid freezing medium and which is thus easy to operate.

Further, the related art calibration apparatuses require the reference thermometer 200 to be removed from the apparatus before and after comparative calibration and to be mounted in an apparatus that provides temperature fixed points for the International Temperature Scale in order to check the thermometer for stability. However, vibration that may occur during the mounting or removal is a major cause of serious adverse effects on the performance of the reference thermometer. Therefore, it would be desirable to provide a calibration apparatus that allows the reference thermometer's performance to be checked for its performance during calibration without the need to remove the reference thermometer from the calibration apparatus.

Some related art calibration apparatuses are described in, for example, Japanese Patent No. 3465402; Japanese Patent Laid-Open No. 2004-317193; Japanese Patent No. 2990276; P. Bloembergen, G. Bonnier and H. Ronsin, "An International Intercomparison of Argon Triple Point Calibration Facilities, Accommodating Long-stem Thermometers" Metrologia 27 (1990) pp. 101-106; G. Furukawa, "Argon triple point apparatus with multiple thermometer wells" in Temperature: Its Measurement and Control in Science and Industry, Vol. 6, Part 1, American Institute of Physics, (1992) pp. 265-299; and S. L. Pond, "Argon Triple-Point Apparatus for SPRT Calibration", in Temperature: Its Measurement and Control in Science and Industry, Vol. 7, Part 1, American Institute of Physics, (2002) pp. 203-208.

As described above, the related art apparatuses for comparative calibration of a sheath-like thermometer use a cooling liquid such as alcohol or silicone oil and a low-temperature freezing medium such as liquefied nitrogen. However, this technique disadvantageously limits the calibration temperature to the one determined by the properties of the freezing medium used.

Further, the related art comparative calibration apparatuses require the reference thermometer to be removed from the apparatus before and after comparative calibration and then mounted in an apparatus for realizing temperature fixed points for the International Temperature Scale in order to check the thermometer for stability. Vibration may occur during the mounting or removal, which is a major cause of serious adverse effects on the performance of the reference thermometer.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An apparatus consistent with the present invention might calibrate a sheath-like thermometer for any temperature by comparison with a reference thermometer without using any cooling liquid or low-temperature freezing medium, in order to enable calibration for the temperature range of 90 K to 170 K or at most 77 K, which has not successfully been dealt with by the related art calibration apparatuses.

Moreover, an apparatus consistent with the present invention might enable the reference thermometer to be checked for its properties while the calibration apparatus is in operation with the reference thermometer installed in the apparatus.

According to one aspect of the present invention, a temperature variable low-temperature comparative calibration apparatus includes a vacuum jacket, a comparative calibration block in the vacuum jacket which is formed of a material of a high heat conductivity and which is maintained at a fixed temperature by a refrigerator or a heater, a reference thermometer housing portion in the comparative calibration block in which a reference thermometer is mounted, and an insertion hole in the comparative calibration block through which a calibration target thermometer is inserted from outside the vacuum jacket via an introduction pipe, the introduction pipe being filled with heat exchange gas.

The temperature varying low-temperature comparative calibration apparatus may include housing portions disposed on a calibration target thermometer insertion side and on an opposite side of the comparative calibration block and in which the calibrated thermometer and the reference thermometer, respectively, are housed.

The temperature varying low-temperature comparative calibration apparatus may include an external first isothermal shield and an internal second isothermal shield covering the comparative calibration block in the vacuum jacket, wherein head exchange gas can be introduced into the first isothermal shield.

The temperature varying low-temperature comparative calibration apparatus may include a temperature-controllable temperature variable block formed of a material of a high heat conductivity and attached to the middle of the introduction pipe.

The temperature of the temperature variable block may be controlled so as to homogenize the temperature of the comparative calibration block in a direction in which the calibration target thermometer is inserted.

The temperature variable low-temperature comparative calibration apparatus may include a sample space in the comparative calibration block which is filled with a fixed point substance or a secondary fixed point substance specified in the International Temperature Scale. The term "secondary fixed point substance" as used herein refers to a substance such as nitrogen or xenon which has a phase transition at the triple point determined by temperature measurement based on the International Temperature Scale.

In the comparative calibration apparatus, the calibration target thermometer located in a space maintained at room temperature may be inserted into the comparative calibration block through the introduction pipe composed of a material such as stainless steel which has a relatively low heat conductivity and filled with heat exchange gas, for example, rare gas such as He. The comparative calibration block may be composed of a material such as copper which has a high heat conductivity and may be maintained at a fixed temperature by controlling the power of the refrigerator or heater, and the reference thermometer may be mounted in the comparative calibration block. This would enable calibration for the temperature range of 90 K to 170 K, or as low as 77 K, which has not successfully been dealt with by the related art calibration apparatuses using related art cooling liquid or liquid freezing medium.

The comparative calibration block in the vacuum jacket may be covered by the external first isothermal shield and the internal second isothermal shield. Heat exchange gas can be introduced into the first isothermal shield. This would enable the interior of the first isothermal shield to quickly reach a target temperature.

Homogenization of temperature of the comparative calibration block could be hindered by the temperature gradients of the introduction pipe, into which the calibration target thermometer is inserted, and the heat exchange gas therein in the axial direction of the introduction pipe. However, the temperature of the comparative calibration block may be homogenized by attaching, to the middle of the introduction pipe, the temperature-controllable temperature varying block composed of a material such as copper which has a high heat conductivity, to control the temperature gradients of the introduction pipe and the heat exchange gas therein in the axial direction of the introduction pipe. Conversely, by controlling the temperature of the temperature varying block so that a temperature gradient is forcibly created in the introduction pipe in its axial direction, it is possible to evaluate the adverse effect, on calibration, of the temperature gradients of the introduction pipe and the heat exchange gas therein.

The calibrated thermometer and the reference thermometer may be installed on the calibration target thermometer insertion side and the opposite side, respectively, of the comparative calibration block to control the temperature of the temperature varying block. This would make it possible to homogenize the temperature of the comparative calibration block in the direction of insertion of the calibration target thermometer.

The sample space may be formed in the comparative calibration block and filled with the fixed point substance such as argon or secondary fixed point substance such as nitrogen or xenon which is specified for the International Temperature Scale to provide the temperature fixed points while the calibration apparatus is in operation. This would enable the reference thermometer to be easily checked for its performance without the need to remove the reference thermometer. Values for the calibration target thermometer can also be checked by realizing the temperature fixed points.

The present invention may also provide the following excellent effects.

The absence of the cooling liquid such as alcohol or silicone oil essentially enables the lower limit of the calibration temperature to be reduced to the temperature at which the heat exchange gas in the introduction pipe, into which the calibration target thermometer is inserted, is liquefied. Using argon as a heat exchange gas sets the lower limit temperature to 87 K. Using neon as a heat exchange gas sets the lower limit temperature to 27 K. Using helium as a heat exchange gas sets the lower limit temperature to 4 K.

It is possible to perform calibration for any temperature within the temperature range of 90 K to 170 K, or as low as 77 K, for which the related art sheath-like thermometers are difficult to calibrate.

By controlling the temperature gradient of the introduction pipe, into which the calibration target thermometer is inserted, in its axial direction, it is possible to inhibit the adverse effect, on calibration, of the temperature gradients of the introduction pipe and the heat exchange gas therein.

The reference thermometer installed in the comparative calibration apparatus can be checked for its performance while the apparatus is in operation. In the related art, the reference thermometer cannot be checked for its performance unless the calibration apparatus is stopped. The present invention would enable checks to be performed while the calibration apparatus is in operation, improving the reliability of calibration. Values for the calibration target thermometer could also be checked by realizing the temperature fixed points.

BRIEF DESCRIPTION OF THE DRAWINGS

FIGS. 3A and 3B are schematic diagrams illustrating the related art.

DETAILED DESCRIPTION OF THE EXEMPLARY EMBODIMENT

With reference to the drawings, description will be given of a temperature varying low-temperature comparative calibration apparatus in accordance with an exemplary embodiment of the present invention.

Figure 1:
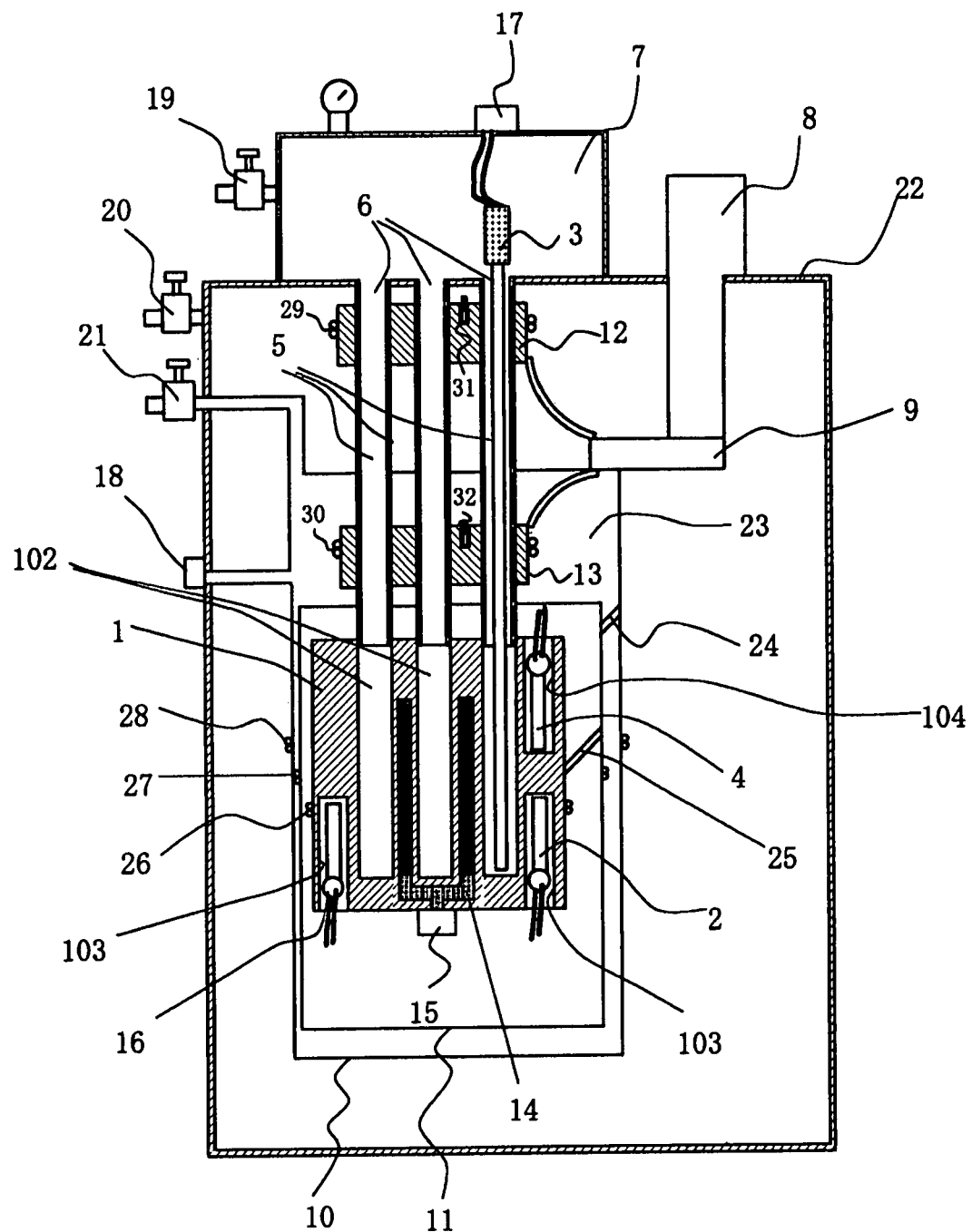
FIG. 1 is a schematic front view illustrating a temperature varying low-temperature comparative calibration apparatus in accordance with an exemplary embodiment of the present invention.

FIG. 1 is a schematic front view illustrating a temperature varying low-temperature comparative calibration apparatus in accordance with an exemplary embodiment of the present invention.

Figure 2:
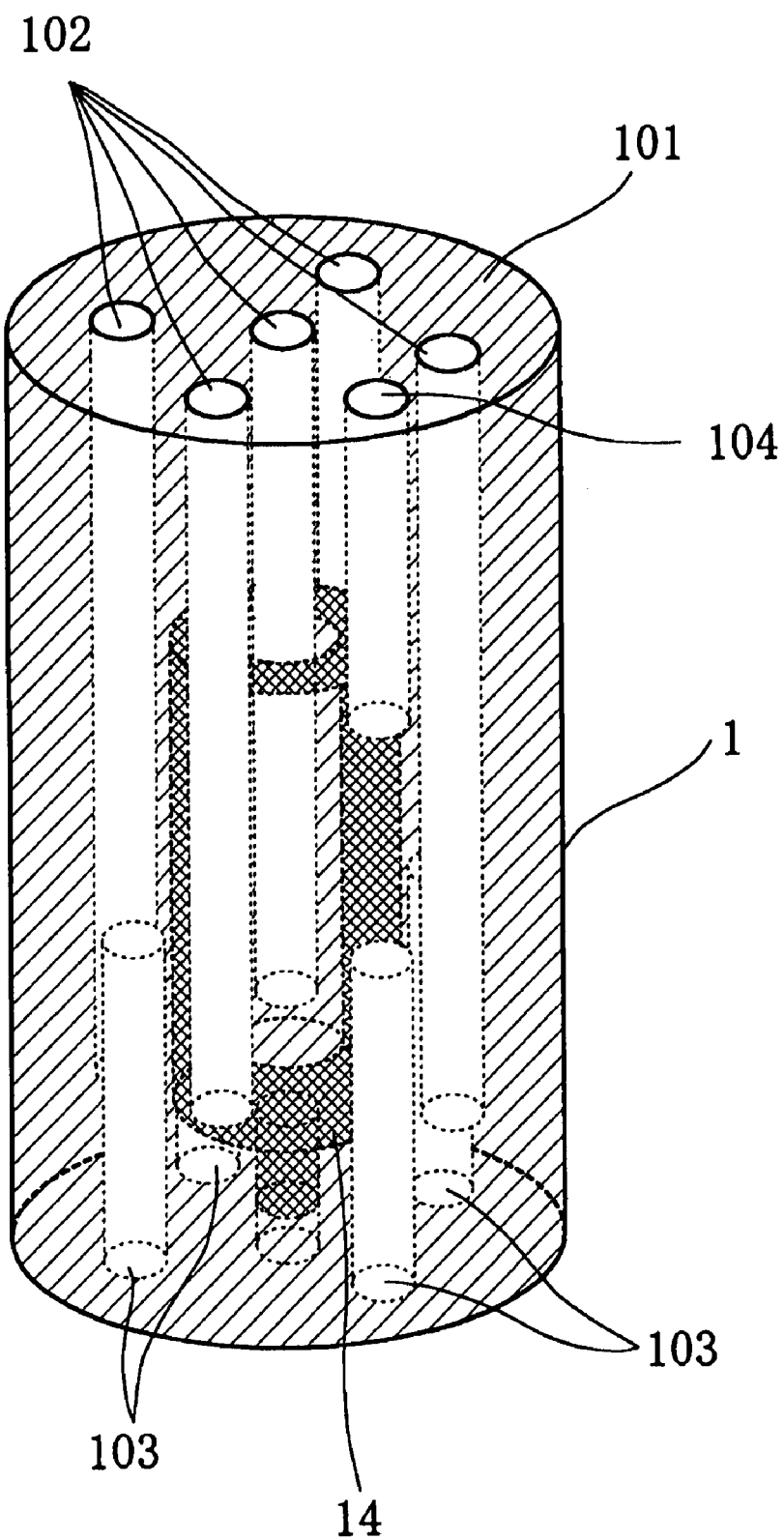
FIG. 2 is a perspective view illustrating a comparative calibration block in FIG. 1.

FIG. 2 is a perspective view illustrating a comparative calibration block in FIG. 1.

The temperature varying low-temperature comparative calibration apparatus is mainly composed of a refrigerator 8 that performs cooling, a calibration target thermometer 3, introduction pipes 5 into which the calibration target thermometer 3 can be inserted, a chamber 7 that fills the introduction pipe 5 with heat exchange gas, a comparative calibration block 1 that calibrates the thermometer, and a vacuum jacket 22 in which the comparative calibration block 1 is installed.

In FIG. 1, the chamber 7 and the refrigerator 8 are disposed above the cylindrical vacuum jacket 22, which could be made of metal. The cylindrical comparative calibration block 1 is installed in the center of lower part of the vacuum jacket 22 and surrounded by a vacuum space. The vacuum jacket 22 has a vacuum chamber exhaust port 20 and is emitted by a vacuum pump (not shown).

The introduction pipes 5 each have a lower end fitted into one of a plurality of calibration target temperature insertion holes 102 formed in the comparative calibration block 1 and an upper end connected to the vacuum jacket 22, as shown in FIG. 1.

The comparative calibration block 1 is formed of a material such as copper which has a high heat conductivity. The introduction pipes 5 are formed of a material such as stainless steel which has a relatively low heat conductivity. The comparative calibration block 1 formed of copper is known to exhibit high temperature stability in the vicinity of the argon triple point and the mercury triple point.

The calibration target thermometer 3 can be inserted into the introduction pipe 5 through the chamber 7 at room temperature.

A sensor portion of the calibration target thermometer 3 is up to 50 mm in length. Accordingly, to ensure the reliability of calibration, the length over which the calibration target thermometer 3 advances through the comparative calibration block 1 is at least twice the sensor length (the length of advancement is at least 100 mm). The diameter of the introduction pipes 5 is about 15 mm so that the assumed calibration target thermometer 3 can be inserted into the pipes 5. The length from thermometer introduction ports 6 to the bottom of the calibration target thermometer insertion holes 102 in the comparative calibration block 1 is about 400 mm; the thermometer introduction ports 6 are provided for the calibration target thermometer 3 and are formed in a room temperature portion that leads into the introduction pipe 5.

As shown in FIGS. 1 and 2, the comparative calibration block 1 has housing portions 103 that houses a reference thermometer 2 and a calibrated check thermometer 16 so that the centers of the reference thermometer 2, the calibrated check thermometer 16, and a sensor portion of the calibration target thermometer 3 are aligned with one another in a vertical direction.

The reference thermometer 2 is a platinum resistance thermometer calibrated in accordance with the International Temperature Scale. In connection with the shape of the reference thermometer, a sheath-like resistance thermometer or a capsule-like resistance thermometer of length about 50 mm may be used. When a capsule-like resistance thermometer is used, it is inserted from under the comparative calibration block. FIG. 1 shows an example in which the reference thermometer 2 is a capsule-type thermometer.

If a sheath-like resistance thermometer is used, it is inserted into the calibration target thermometer insertion hole 102 in the comparative calibration block 1 through the introduction pipe 5 similarly to the calibration target thermometer. In this case, the insertion hole in which the sheath-like resistance thermometer is placed corresponds to a reference thermometer housing portion.

To fill heat exchange gas into the introduction pipe 5, into which the calibration target thermometer 3 is inserted, the chamber 7 covers the entire top of the calibration target thermometer 3 so that the gas in the chamber 7 can be replaced with heat exchange gas. The chamber 7 has a heat exchange gas introduction and exhaust port 19 through which heat exchange gas is introduced or emitted. Further, to obtain a signal for the calibration target thermometer 3 from inside the chamber 7, the chamber 7 has a calibration target thermometer connector 17.

The comparative calibration block 1 within the vacuum jacket 22 is covered by a first isothermal shield 10 and a second isothermal shield 11. The first isothermal shield 10 is cooled by contacting the refrigerator 8 via a heat conducting metal member 9. To enable heat exchange gas to be introduced to allow the interior of the first isothermal shield 10 to quickly reach the target temperature, a space 23 is formed between the first isothermal shield 10 and the second isothermal shield 11 and connected to the heat exchange gas introduction and exhaust port 21, formed in the vacuum jacket 22, to allow the introduction and emission of the heat exchange gas. If the heat exchange gas affects calibration, the heat exchange gas is evacuated by the vacuum pump (not shown) after the target temperature has been reached. The first isothermal shield 10 and the second isothermal shield 11 are formed of a material such as copper or aluminum which has a high heat conductivity. While the first isothermal shield 10 blocks gas, the second isothermal shield 11 allows the permeation of gas.

The second isothermal shield 11 is cooled by being connected to the first isothermal shield 10 via a heat conducting metal member 24. The comparative calibration block 1 is cooled by being connected to the second isothermal shield 11 via a heat conducting metal member 25.

To perform comparative calibration, the comparative calibration block 1 is controllably heated by a heater 26 attached thereto so that its temperature reaches a target value. To prevent heating by the heater 26 from affecting the temperature homogeneity of and the calibration by the comparative calibration block 1, the second isothermal shield 11 is controllably heated by a heater 27 attached thereto to inhibit heat release from the comparative calibration block 1. To reduce a variation in temperature caused by the refrigerator 8 to prevent calibration from being affected, the first isothermal shield 10 is controllably heated by a heater 28 attached thereto.

The vacuum jacket 22 has an intra-first-isothermal-shield thermometer and a heater signal connector 18. Temperature controlling thermometers (not shown) are attached to the first isothermal shield, second isothermal shield, and comparative calibration block.

A large quantity of heat flows into the comparative calibration block 1 due to the heat exchange gas inside the introduction pipe 5, into which the calibration target thermometer 3 is inserted. The adverse effect of the heat inflow on the temperature homogeneity of and the calibration by the comparative calibration block 1 can be determined on the basis of the difference between a temperature indicated by a calibrated capsule-like thermometer 4 attached to the upper part of the comparative calibration bock 1 and a temperature indicated by, for example, a capsule-like reference thermometer (or calibrated thermometer) 2 attached to the lower part of the comparative calibration block 1. Further, a first temperature variable block 12 is disposed in the vicinity of the upper end of the introduction pipe 5. A second temperature variable block 13 is disposed in the space 23 between the first isothermal shield 10 and the second isothermal shield 11. The temperatures of both temperature variable blocks 12 and 13 are controlled so as to inhibit the heat inflow from the interior of the introduction pipe 5 from affecting calibration. To achieve this, the first temperature variable block 12 and second temperature variable block 13 are formed of a material of a high heat conductivity material and connected to the heat conducting metal member 9. Further, heaters 29 and 30 are attached to the first and second temperature variable blocks 12 and 13, respectively, and thermometers 31 and 32 are attached to the first and second temperature variable blocks 12 and 13, respectively. The vacuum jacket 22 has an intra-vacuum-chamber thermometer and a heater signal connector, which are not shown in the drawings.

With the heat inflow through the introduction pipe 5 and the temperature homogeneity of the comparative calibration block 1 optimally controlled, the reference thermometer 2 and calibration target thermometer 3, attached to the comparative calibration block 1, are compared with each other to calibrate the calibration target thermometer 3.

As shown in FIG. 2, the comparative calibration block 1 comprises a cylindrical object having a plurality of holes formed parallel to the axis of the cylinder and in which the thermometers are mounted.

FIG. 2 shows a total of five calibration target thermometer insertion holes 102; one of the calibration target thermometer insertion holes 102 is formed substantially at the central axis of the comparative calibration block 1 and the remaining four are formed at an equal distance from the central axis. The above introduction pipes 5 are fitted into the respective calibration target thermometer insertion holes 102.

The housing portions 103 are formed in the lower part of the comparative calibration block 1 at an equal distance from the central axis of the comparative calibration block 1; the housing portions 103 comprise insertion holes in which the reference thermometer 2 and at least one calibrated check thermometer 16 are mounted. Moreover, a housing portion 104 is formed in the upper part of the comparative calibration block 1; the housing portion 104 comprises an insertion hole in which the calibrated thermometer 4 is mounted.

The calibration target thermometer insertion hole 102 and the housing portions 103, in which the reference thermometer 2 and check thermometer 16 are housed, are disposed so the centers of the reference thermometer 2, the check thermometer 16, and the sensor portion of the calibration target thermometer 3 are aligned with one another in a vertical direction.

A comparison of the temperature indicated by the reference thermometer 2 with the temperature indicated by the check thermometer 16 makes it possible to determine whether or not the reference thermometer 2 is stable and to evaluate the temperature distribution of the comparative calibration block 1 in a circumferential direction.

As shown in FIGS. 1 and 2, the comparative calibration block 1 has a sample space 14 formed so as to surround the calibration target thermometer insertion hole 102, located at the central axis. A fixed point substance such as argon or a secondary fixed point substance such as nitrogen or xenon, specified for the International Temperature Scale, is sealingly introduced into the comparative calibration block 1 through a sample introduction and sealing port 15 disposed at the bottom of the comparative calibration block 1, to realize the temperature fixed point. This enables the calibration apparatus to be checked for its performance while the apparatus is in operation without the need to remove the reference thermometer 2.

The absence of the cooling liquid such as alcohol or silicone oil enables comparative calibration to be performed on a sheath-like thermometer for any temperature within the temperature range of lower than 170 K. The absence of the liquid freezing medium such as liquefied nitrogen gas improves the safety of the apparatus and allows the apparatus to be operated relatively easily. This makes it possible to reduce calibration burdens. As a result, the apparatus can be used at 170 K or lower for article manufacturing or quality control in food industries, medical industries, and the like. It is desirable to calibrate a sheath-like thermometer at any temperature equal to or lower than 170 K in order to ensure safety control in the food industries and medical industries. The exemplary embodiment of the present invention can meet this desire.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A temperature varying low-temperature comparative calibration apparatus comprising:
   a vacuum jacket
   a comparative calibration block in the vacuum jacket which is formed of a material of a high heat conductivity and which is maintained at a fixed temperature by a refrigerator or a heater;
   wherein the refrigerator or the heater is installed inside the vacuum jacket,
   a reference thermometer housing portion in the comparative calibration block in which a reference thermometer is mounted;
   an insertion hole in the comparative calibration block through which a calibration target thermometer is inserted from outside the vacuum jacket via an introduction pipe, the introduction pipe being filled with heat exchange gas, and
   housing portions disposed on a calibration target thermometer insertion side and on an opposite side of the comparative calibration block and in which the calibrated thermometer and the reference thermometer, respectively, are housed.

2. The temperature varying low-temperature comparative calibration apparatus according to claim 1, further comprising a sample space in the comparative calibration block which is filled with a fixed point substance or a secondary fixed point substance specified in the International Temperature Scale.

3. The temperature varying low-temperature comparative calibration apparatus according to claim 1, further comprising a sample space in the comparative calibration block which is filled with a fixed point substance or a secondary fixed point substance specified in the International Temperature Scale.

4. The temperature varying low-temperature comparative calibration apparatus according to claim 1, wherein the apparatus performs calibration at a low-temperature of 170K (−100° C.) or below.

5. The temperature varying low-temperature comparative calibration apparatus according to claim 1, wherein the calibration target thermometer is compared with the reference thermometer to calibrate the calibration target thermometer.

6. The temperature varying low-temperature comparative calibration apparatus according to claim 1, further comprising a temperature-controllable temperature varying block formed of a material of a high heat conductivity and attached to the middle of the introduction pipe.

7. The temperature varying low-temperature comparative calibration apparatus according to claim 6, wherein the temperature of the temperature varying block is controlled so as to homogenize the temperature of the comparative calibration block in a direction in which the calibration target thermometer is inserted.

8. The temperature varying low-temperature comparative calibration apparatus according to claim 1, further comprising an external first isothermal shield and an internal second isothermal shield covering the comparative calibration block in the vacuum jacket, wherein heat exchange gas can be introduced into the first isothermal shield.

9. The temperature varying low-temperature comparative calibration apparatus according to any one of claim 8, further comprising a temperature-controllable temperature varying block formed of a material of a high heat conductivity and attached to the middle of the introduction pipe.

10. The temperature varying low-temperature comparative calibration apparatus according to claim 9, wherein the temperature of the temperature variable block is controlled so as to homogenize the temperature of the comparative calibration block in a direction in which the calibration target thermometer is inserted.

11. The temperature varying low-temperature comparative calibration apparatus according to claim 1, further comprising an external first isothermal shield and an internal second isothermal shield covering the comparative calibration block in the vacuum jacket, wherein heat exchange gas can be introduced into the first isothermal shield.

12. The temperature varying low-temperature comparative calibration apparatus according to claim 11, further comprising a sample space in the comparative calibration block which is filled with a fixed point substance or a secondary fixed point substance specified in the International Temperature Scale.

13. The temperature varying low-temperature comparative calibration apparatus according to any one of claim 11, further comprising a temperature-controllable temperature varying block formed of a material of a high heat conductivity and attached to the middle of the introduction pipe.

14. The temperature varying low-temperature comparative calibration apparatus according to claim 13, wherein the temperature of the temperature varying block is controlled so as to homogenize the temperature of the comparative calibration block in a direction in which the calibration target thermometer is inserted.

15. A temperature varying low-temperature comparative calibration apparatus comprising:
   a vacuum jacket
   a comparative calibration block in the vacuum jacket which is formed of a material of a high heat conductivity and which is maintained at a fixed temperature by a refrigerator or a heater,
   wherein the refrigerator or the heater is installed inside the vacuum jacket,
   a reference thermometer housing portion in the comparative calibration block in which a reference thermometer is mounted;
   an insertion hole in the comparative calibration block through which a calibration target thermometer is inserted from outside the vacuum jacket via an introduction pipe, the introduction pipe being filled with heat exchange gas, and
   a temperature-controllable temperature varying block formed of a material of a high heat conductivity and attached to the middle of the introduction pipe.

16. The temperature varying low-temperature comparative calibration apparatus according to claim 15, wherein the temperature of the temperature varying block is controlled so as to homogenize the temperature of the comparative calibration block in a direction in which the calibration target thermometer is inserted.

17. The temperature varying low-temperature comparative calibration apparatus according to claim 15, further comprising a sample space in the comparative calibration block which is filled with a fixed point substance or a secondary fixed point substance specified in the International Temperature Scale.

18. The temperature varying low-temperature comparative calibration apparatus according to claim 15, wherein the temperature of the temperature varying block is controlled so as to homogenize the temperature of the comparative calibration block in a direction in which the calibration target thermometer is inserted.

19. The temperature varying low-temperature comparative calibration apparatus according to claim 18, further comprising a sample space in the comparative calibration block which is filled with a fixed point substance or a secondary fixed point substance specified in the International Temperature Scale.

* * * * *